United States Patent [19]

Namito et al.

[11] 3,923,826

[45] Dec. 2, 1975

[54] SYNTHESIS OF 5-(BETA-METHYLMERCAPTOETHYL)-HYDANTOIN

[75] Inventors: Yoshio Namito; Masahiro Kobayashi; Takeshi Kojima, all of Kobe, Japan

[73] Assignee: Kanegafuchi Kagaku Kogyo Kabushiki Kaisha, Osaka, Japan

[22] Filed: June 17, 1974

[21] Appl. No.: 480,277

[30] Foreign Application Priority Data

June 20, 1973 Japan.............................. 48-70168

[52] U.S. Cl. .......................................... 260/309.5
[51] Int. Cl.² .................................... C07D 49/34
[58] Field of Search ................................ 260/309.5

[56] References Cited
UNITED STATES PATENTS

| | | | |
|---|---|---|---|
| 2,480,644 | 8/1949 | Goldsmith et al. | 260/309.5 X |
| 2,612,521 | 9/1952 | MacDonald | 260/309.5 X |
| 2,999,863 | 9/1961 | Upham | 260/309.5 X |

FOREIGN PATENTS OR APPLICATIONS

| | | | |
|---|---|---|---|
| 1,108,926 | 4/1968 | United Kingdom | 260/309.5 |

*Primary Examiner*—Ethel G. Love
*Attorney, Agent, or Firm*—James C. Haight

[57] ABSTRACT

5-($\beta$-methylmercaptoethyl) hydantoin is synthesized in a good yield by reacting $\beta$-methylmercaptopropionaldehyde with hydrogen cyanide and a $CO_2$ and $NH_3$ source selected from the group consisting of ammonium bicarbonate, ammonium carbonate and a mixture of carbon dioxide and ammonia in the presence of a caustic alkali.

10 Claims, No Drawings

SYNTHESIS OF 5-(BETA-METHYLMERCAPTOETHYL)-HYDANTOIN

This invention relates to synthesis of 5-($\beta$-methylmercaptoethyl) hydantoin. Sodium cyanide and hydrogen cyanide may be named as a cyanogen source for the synthesis of 5-($\beta$-methylmercaptoethyl) hydantoin. However, suitable conditions and procedures have been known only with the reaction of sodium cyanide. Conditions and procedures of the synthesis with the use of hydrogen cyanide have not yet been established for practical purposes.

According to our study on the synthesis with the use of hydrogen cyanide, the reaction requires a longer period of time greater than 5 hours at a temperature below 70°C. If the reaction temperature is raised to above 80°C to shorten the reaction time, a side reaction will unavoidably take place so that the reaction mixture darkens remarkably. The side reaction decreases both the quality and the yield of 5-($\beta$-methylmercaptoethyl)-hydantoin and, therefore, is undesirable for practicing the synthesis on a large scale.

It is an object of the present invention to provide a method of synthesis of 5-($\beta$-methylmercaptoethyl) hydantoin with the use of hydrogen cyanide in a high yield without requiring a longer period of reaction time. Other objects and advantages of the present invention will be apparent as the description proceeds.

According to the present invention, the above and other objects are achieved by reacting $\beta$-methylmercaptopropionaldehyde with hydrogen cyanide and a $CO_2$ and $NH_3$ source selected from the group consisting of ammonium bicarbonate, ammonium carbonate, and a mixture of carbon dioxide and ammonia in the presence of a caustic alkali.

The preferable range of molar ratios of the reatants based on the molarity of $\beta$-methylmercaptopropionaldehyde is: 1 to 2 for hydrogen cyanide, 1 to 3 moles for the $CO_2$ and $NH_3$ source, and 0.1 to 2 moles for the caustic alkali. Examples of suitable caustic alkali are sodium hydroxide, potassium hydroxide and lithium hydroxide.

In amounts of less than 0.1 mole, the caustic alkali is not effective and the use of the same in amounts exceeding 2 moles causes polymerization of the aldehyde.

The reaction may preferably be carried out in an aqueous medium such as water, aqueous methanol, aqueous ethanol and the like.

The reaction proceeds sufficiently at a temperature of about 50°C to 90°C. The reaction time varies with the reaction temperature, as usual, but is generally 1 to 3 hours. Excessive reaction times will not result in any severely adverse effect. For example, the reaction will be substantially complete within 2 hours at about 80°C.

The reaction mixture thus obtained may be utilized without isolation and further purification in obtaining DL-methionine. Since the present invention makes it possible to use hydrogen cyanide as the cyanogen source of the synthesis, this method is economically more advantageous than the prior method using sodium cyanide.

The following examples are offered for illustrative purposes only, and are not intended to limit the scope of the present invention, which is defined in the claims below.

EXAMPLE 1

28g of ammonium bicarbonate, 10g of sodium hydroxide, 24g of $\beta$-methylmercaptopropionaldehyde and 146g of water are charged in a 500 ml capacity flask having a stirring means. 7g of hydrogen cyanide is added to the flask at 10°C with stirring. The mixture is then stirred at 80°C for 2 hours.

The resulting reaction mixture is a homogeneous, clear, pale-yellow liquid. The yield of 5-($\beta$-methylmercaptoethyl) hydantoin is 97% based on $\beta$-methylmercaptopropinaldehyde.

EXAMPLE 2

25g of ammonium carbonate, 9g of sodium hydroxide and 134g of water are charged in a 500 ml capacity flask having a stirring means. 7g of hydrogen cyanide and 22g of $\beta$-methylmercaptopropionaldehyde are added to the flask successively with stirring while the temperature is kept at 10°C. The mixture is stirred at 80°C for 2 hours.

The resulting reaction mixture is a homogeneous, clear, pale-yellow liquid. The yield of 5-($\beta$-methylmercaptoethyl) hydantoin is 98% based on $\beta$-methylmercaptopropionaldehyde.

To prove the effectiveness of the use of caustic alkali, 19g of ammonium carbonate and 100g of water are charged in a 300 ml capacity flask of the same type. 5g of hydrogen cyanide and 17g of $\beta$-methylmercaptopropinaldehyde are added to the flask successively while the mixture is maintained at 10°C. The mixture not containing caustic alkali is stirred at 80°C for 2 hours.

The resulting reaction mixture is a heterogeneous, cloudy, brown liquid containing partly separated oily substances. The yield of 5-($\beta$-methylmercaptoethyl) hydantoin is 81% based on $\beta$-methylmercaptopropionaldehyde.

Various other examples and modifications of the foregoing examples can be devised by the person skilled in the art after reading the foregoing disclosure and appended claims without departing from the spirit and scope of the invention. All such further examples and modifications thereof are included within the scope of said claims.

What is claimed is:

1. A method of synthesizing 5-($\beta$-methylmercaptoethyl) hydantoin which comprises reacting $\beta$-methylmercaptopropionaldehyde with reactants consisting essentially of, per mole of $\beta$-methylmercaptopropionaldehyde, 1–2 moles of hydrogen cyanide and 1–3 moles of a $CO_2$ and $NH_3$ source selected from the group consisting of ammonium bicarbonate, ammonium carbonate and and a mixture of carbon dioxide and ammonia in the presence of 0.1–2 moles of a caustic alkali.

2. A method according to claim 1, wherein said caustic alkali is sodium hydroxide.

3. A method according to claim 1, wherein said caustic alkali is potassium hydroxide.

4. A method according to claim 1, wherein said $CO_2$ and $NH_3$ source is ammonium bicarbonate.

5. A method according to claim 1, wherein said $CO_2$ and $NH_3$ source is ammonium carbonate.

6. A method according to claim 1, wherein said $CO_2$ and $NH_3$ source is a mixture of carbon dioxide and ammonia.

7. A method according to claim 1, wherein the reaction is carried out at a temperature between 50° and 90°C.

8. A method according to claim 1, wherein the reaction is carried out at about 80°C.

9. A method according to claim 1, wherein the reaction is carried out in an aqueous medium.

10. A method according to claim 1, wherein the caustic alkali is sodium hydroxide or potassium hydroxide and the reaction is carried out in an aqueous medium at a temperature of 50°–90° C.

* * * * *